No. 780,430. PATENTED JAN. 17, 1905.
F. KRESS.
CULTIVATOR.
APPLICATION FILED JULY 1, 1904.
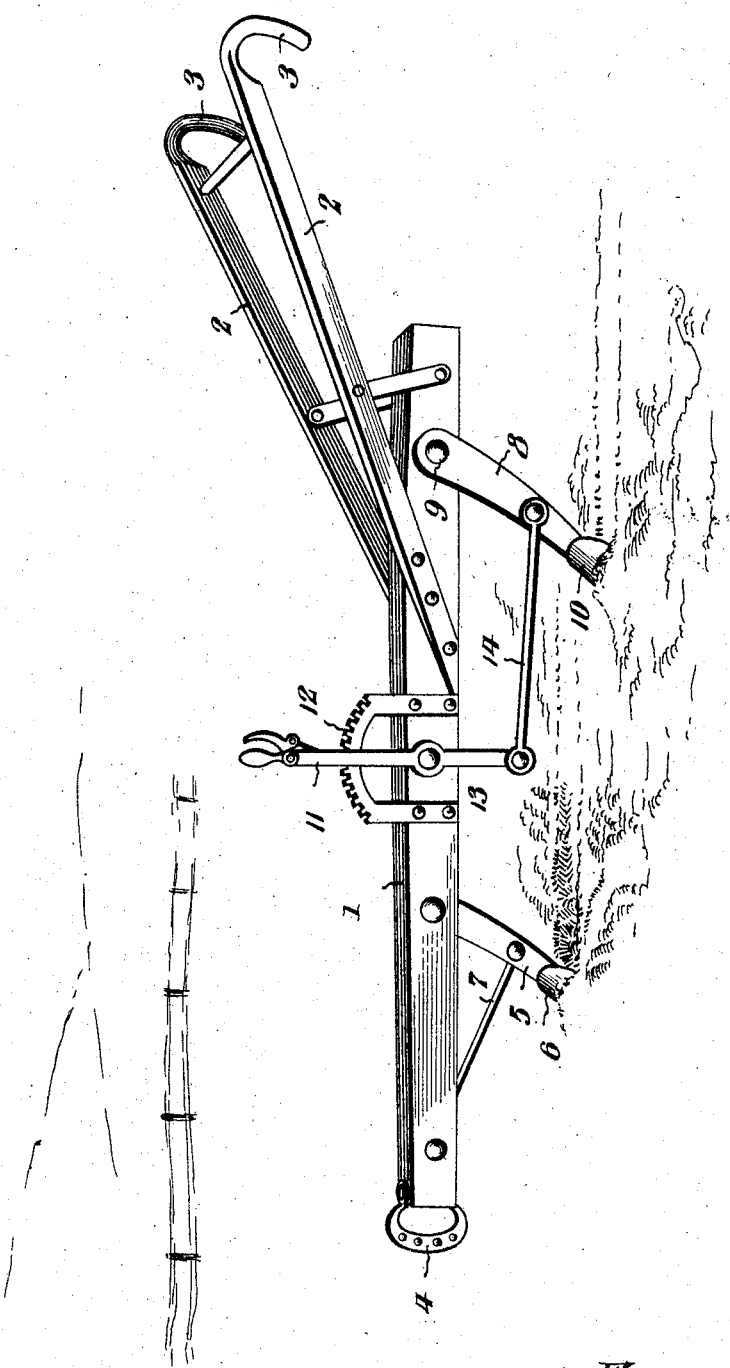
Inventor
Frank Kress.
Witnesses
F. W. C. Riley.
Katharine Allen.
By Victor J. Evans
Attorney No. 780,430.

Patented January 17, 1905.

UNITED STATES PATENT OFFICE.

FRANK KRESS, OF PISGAH, IOWA.

CULTIVATOR.

SPECIFICATION forming part of Letters Patent No. 780,430, dated January 17, 1905.

Application filed July 1, 1904. Serial No. 214,948.

*To all whom it may concern:*

Be it known that I, FRANK KRESS, a citizen of the United States, residing at Pisgah, in the county of Harrison and State of Iowa, have invented new and useful Improvements in Cultivators, of which the following is a specification.

This invention relates to cultivators, the object of the invention being to provide what may be termed an "attachment" for cultivators by means of which the cultivator as a whole is adapted to sidehill plowing or cultivating as well as operating upon level ground, the primary object of the invention being to provide, in connection with the beam or frame of a riding or walking cultivator, a shovel and standard, the latter of which has a jointed connection with such beam or frame and is operatively coupled to a hand-lever by means of which the point of the shovel may be raised and lowered for the purpose of regulating the depth of penetration of the shovel. By the means described one shovel may be set lower or higher than the adjoining shovel, so that in sidehill work both shovels will operate at substantially the same depth in the soil.

A further object of the invention is to so mount said shovel and the operating mechanism therefor that the said shovel may quickly and easily be adjusted by the operator without stopping the machine and as frequently as may be necessary owing to the varying slope or angle of the hill being worked.

With the above and other objects in view the invention consists in the novel construction, combination, and arrangement of parts, as hereinafter fully described, illustrated, and claimed.

The accompanying drawing represents a perspective view of a cultivator embodying the present invention.

In the drawing I have represented a simple form of cultivator embodying the usual frame or beam 1, provided with handle-bars 2 and handles 3 and clevis 4. Extending downward from the beam 1 at a suitable point is a fixed standard 5, to the lower end of which is connected a shovel 6 of any desired type, while the fixed standard 5 is connected by a forwardly and upwardly inclining brace 7 with the forward portion of the beam 1, as shown. In carrying out the present invention a second standard 8 is connected to the rear portion of the beam 1 by a pivot-joint, as shown at 9, and is equipped at its lower end with a shovel 10. In order to adjust the standard 8 on its pivot 9, I employ a thumb-latch lever 11, carrying a thumb-latch which engages a segmental rack 12 for holding the lever at any desired point of adjustment, said lever being pivotally mounted at 13 on the beam and having pivotally connected to its lower arm a draft-link 14, which connects pivotally at its opposite end to the adjustable standard 8. It will be noticed that the fixed standard 5 is connected to one side of the frame or beam 1, while the adjustable standard is connected to the opposite side, so that said standards are laterally offset from each other to work in different but parallel planes. Ordinarily the standards 5 and 8 will be of the same length and set at the same angle in working on level ground. In operating on a sidehill, however, in order to have the shovels operate at a uniform depth in the soil the standard 8 will be swung forward or backward by means of the thumb-latch lever 11, which through the connections described has the effect of raising or lowering the shovel 10, and thus compensating for the pitch or slope of the ground on the sidehill.

By the means above described the movable shovel may be quickly adjusted without stopping the cultivator and without the use of any tools, the operator simply being required to grasp the thumb-latch lever and throw the same one way or the other. Both shovels may be made to operate at the same depth in the soil, and the device as a whole may be applied to and used in connection with any form of riding or walking cultivator.

I am aware that it is not broadly new to adjust the shovels of a plow or cultivator in a vertical direction, and I disclaim this construction broadly. My invention resides in the simplified form of structure hereinbefore described.

Having thus described the invention, what is claimed as new is—

A cultivator comprising a beam or frame, a fixed standard on one side thereof, a shovel on the fixed standard, a movable standard pivotally connected at its upper end to the beam on the side thereof opposite the fixed standard, a shovel on the movable standard, a lever pivoted intermediate its ends to the beam, the lower end of said lever extending below said beam, and the upper end of said lever extending above said beam, a draw-rod connecting the lower end of the lever with the movable standard, a thumb-latch upon the lever, and a segmental rack upon the beam adapted to be engaged by the thumb-latch, substantially as described.

In testimony whereof I affix my signature in presence of two witnesses.

FRANK KRESS.

Witnesses:
J. J. WYATT,
J. E. LANE.